(12) United States Patent
Borenstain et al.

(10) Patent No.: US 10,877,406 B2
(45) Date of Patent: Dec. 29, 2020

(54) PRINTING BY PRINTING FLUID TRANSFER

(71) Applicant: HP Indigo B.V., Amstelveen (NL)

(72) Inventors: Shmuel Borenstain, Ness Ziona (IL); David Savelzon, Ness Ziona (IL); Gil Bar-Haim, Ness Ziona (IL)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 16/632,414

(22) PCT Filed: Sep. 27, 2017

(86) PCT No.: PCT/EP2017/074517
§ 371 (c)(1),
(2) Date: Jan. 20, 2020

(87) PCT Pub. No.: WO2019/063075
PCT Pub. Date: Apr. 4, 2019

(65) Prior Publication Data
US 2020/0225606 A1   Jul. 16, 2020

(51) Int. Cl.
*G03G 15/16* (2006.01)
*G03G 15/10* (2006.01)

(52) U.S. Cl.
CPC .......... *G03G 15/1665* (2013.01); *G03G 15/10* (2013.01)

(58) Field of Classification Search
CPC .. G03G 15/1665; G03G 15/10; G03G 15/065; G03G 15/0121; G03G 2215/0658
See application file for complete search history.

(56) References Cited

U.S. PATENT DOCUMENTS

| | | | |
|---|---|---|---|
| 5,155,530 A | 10/1992 | Larson et al. | |
| 6,318,852 B1 | 11/2001 | White | |
| 8,553,281 B2 | 10/2013 | Barth et al. | |
| 9,232,112 B2 | 1/2016 | Choulet | |
| 2001/0028805 A1 | 10/2001 | Haneda | |
| 2005/0238971 A1 | 10/2005 | Jodra et al. | |
| 2010/0226670 A1* | 9/2010 | Toyama | G03G 15/10 399/51 |
| 2011/0063697 A1 | 3/2011 | Shibuya | |
| 2015/0370206 A1 | 12/2015 | Hitosugi et al. | |
| 2016/0002482 A1 | 1/2016 | Merchak | |

FOREIGN PATENT DOCUMENTS

EP    3223080    9/2017

OTHER PUBLICATIONS

Brzozowski, Carol, "2016 Ink Report", Oct. 1, 2016, Wide-Format & Signage, < http://www.printingnews.com/article/12254784/2016-ink-report >.

* cited by examiner

*Primary Examiner* — Sandra Brase
(74) *Attorney, Agent, or Firm* — Dierker & Kavanaugh PC

(57) ABSTRACT

In an example of a printing system, the amount of a printing fluid that is transferred from a developer unit onto an imaging plate is varied in order to alter the optical density of an area covered by the printing fluid.

4 Claims, 7 Drawing Sheets

PRINTING BY PRINTING FLUID TRANSFER

BACKGROUND

Digital press refers to a printing system or printing technique for transferring an image, which is obtained from digital data, on a print medium. Pigmented particles in a printing fluid are transferred onto the surface of an imaging plate according to the image, and from the imaging plate onto the print medium. A further transfer unit, for example a blanket, may be provided to transfer the printing fluid or the pigmented particles from the imaging plate to the print medium. The printing fluid or the pigmented particles may be transferred from one to another unit of the digital press by means of electrical forces.

BRIEF DESCRIPTION OF THE DRAWINGS

The following examples will become more readily appreciated in conjunction with the accompanying drawings, in which like reference numerals refer to like parts throughout the various views, unless otherwise specified.

DETAILED DESCRIPTION

The subset of colors that can be accurately represented by a printing system, or any other image output device, can be quantified by its color gamut volume. For example, the color gamut volume of a printing system can be delineated by the number of selected coordinates in the L*a*b* space.

A printing system, for example a digital press, may comprise multiple developer units each corresponding to a process color. Each of the developer units may be a device containing or supplied with a respective printing fluid of a specific color. A set of colors may be created by (partially) mixing the process colors. The process colors may correspond to a chosen color model, for example cyan-magenta-yellow-black ("key") (CMYK).

The printing fluids may be transferred onto a target element, which may be part of the printing system or print medium, by a respective default amount per unit area. The target element for example may be an imaging plate, an intermediate transfer member or the print medium such as paper, foil, textile, etc. The default amount of the printing fluid per unit area may be determined according to a color calibration of the printing system. The color calibration may be directed to industrial standards. For example, the amount of the printing fluid per unit area may be measured by the amount of the transferred printing fluid in a pixel, or by the volume of a droplet that forms the smallest amount of the printing fluid transferred. The unit area may refer to a pixel or to the smallest definable area of the printing system. The amount of the printing fluid per unit area may be proportional to the thickness of the printing fluid transferred onto the target element per unit area.

Moreover, the default amount of the printing fluid per unit area may be determined according to a desired optical density at the target element. The optical density represents a density of pigmented particles in a unit area. One way to express the optical density OD is, according to Beer's Law:

$$OD = \varepsilon \cdot c \cdot d$$

wherein $\varepsilon$ is the extinction coefficient, c the concentration of the pigments, and d the thickness of the printing fluid. The reflectance R is a function of wavelength-dependent optical density:

$$R(\lambda) = 10^{-OD(\lambda)}$$

wherein $\lambda$ is the wavelength.

Both the reflectance and the absorbance of an area covered by the printing fluid can be altered by increasing or decreasing the optical density in this area. At the same time, the coordinates of the printing fluid in the L*a*b* space may change as a result. Accordingly, the color gamut volume of the printing system can be modified by varying the optical density, as explained in more detail below.

Figure 5:
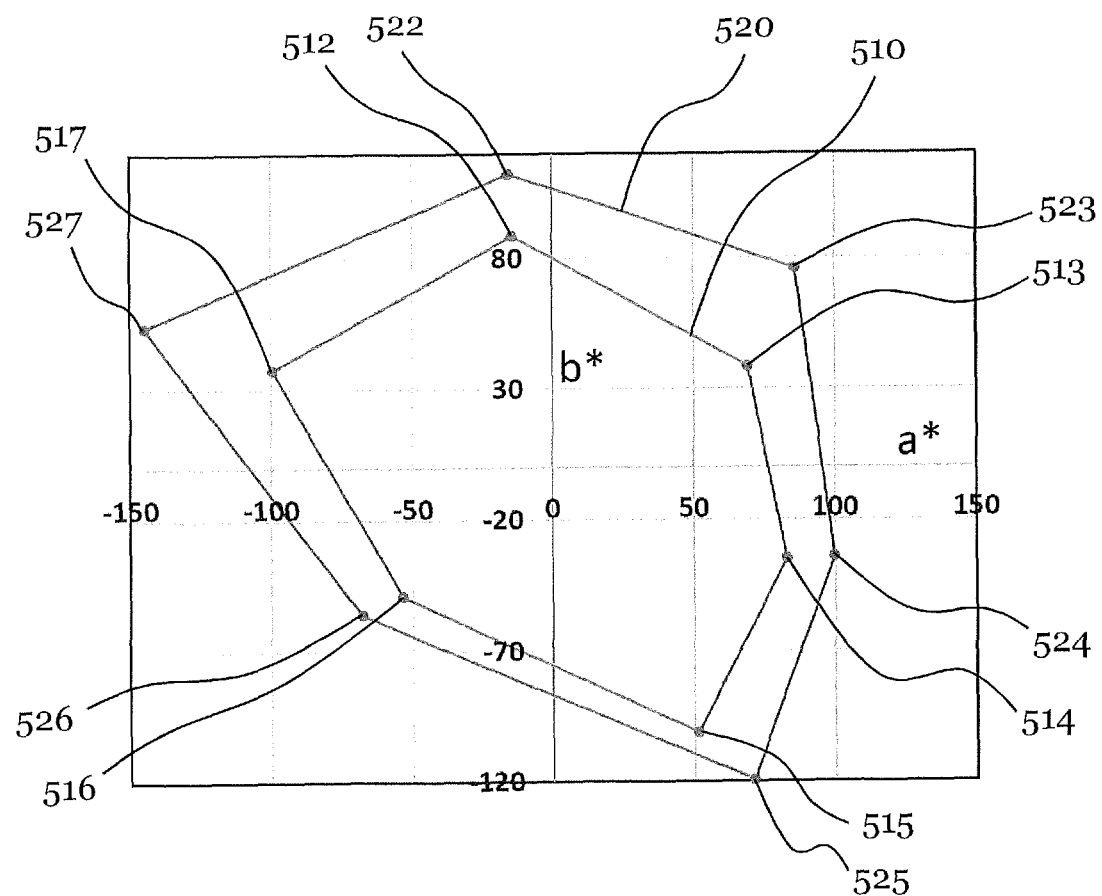
FIG. 5 is an illustration of color gamut coverage in a*-b*-plane with the optical density varied, according to an example.

FIG. 5 illustrates color gamut in a*-b*-plane with the optical density varied. The positive and negative directions of the a*-axis represent red and green color, respectively. The positive and negative directions of the b*-axis represent yellow and blue color, respectively. The polar angle in the a*-b*-plane corresponds to the hue of the color. The distance from the center corresponds to the chroma of the color.

A first loop 510 and a second loop 52o represent the color gamut with an optical density of 1 and 2, respectively. The loops 510, 520 connect the standard process colors CMY and their combined colors OVG (orange-violet-green). Dots 512, 522 correspond to yellow, dots 514, 524 correspond to magenta, and dots 516, 526 correspond to cyan. Dots 513, 523 correspond to orange, dots 515, 525 correspond to violet, and dots 517, 527 correspond to green.

The comparison of the coordinates of the dots representing the same color with different optical densities shows that both the hue and the chroma change when the optical density is altered. Also, the color gamut volume in total increases as the optical density is increased from 1 to 2.

Figure 1:
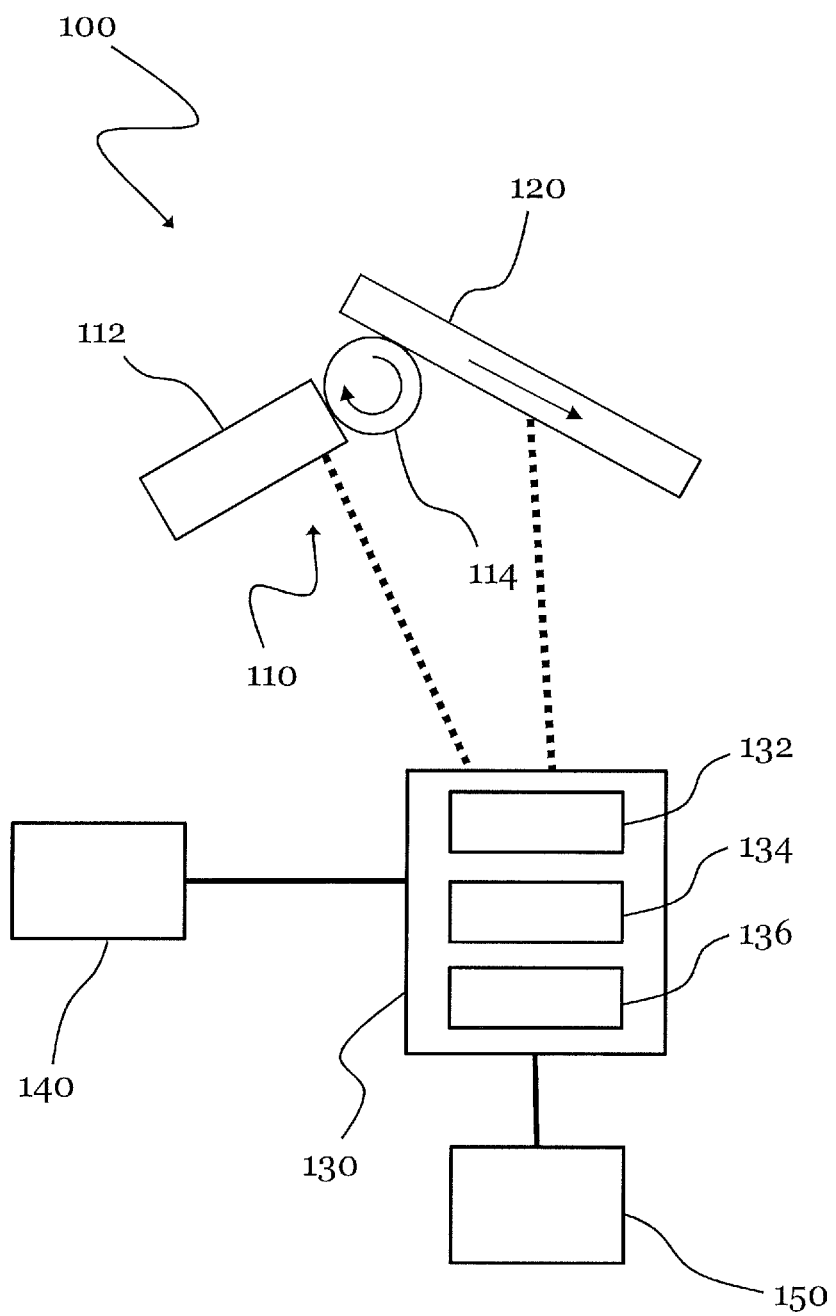
FIG. 1 is a schematic cross-sectional view of a printing system, according to an example.

FIG. 1 is a schematic cross-sectional view of a printing system 100 according to an example. In some examples, the printing system 100 employs, but is not limited to, liquid electro-photographic, LEP, printing.

The LEP printing, sometimes also referred to as liquid electrostatic printing, uses a printing liquid including pigmented particles dispersed in a carrier liquid to form images on the print medium. In an example, the pigmented particles carry a color corresponding to one of the process colors in accordance with the used color model, for example CMYK.

A LEP printing process may involve selectively charging/discharging a photoconductor, also referred to as an imaging plate, to produce a latent electrostatic image. For example, the imaging plate may be uniformly charged and selectively exposed to a light to dissipate the charge accumulated on the exposed areas of the photoconductor. The resulting latent image on the photoconductor may then be developed by applying a thin layer of charged pigmented particles to the photoconductor.

The charged pigmented particles may adhere to negatively charged or discharged areas on the photoconductor (discharged area development DAD) or to positively charged areas on the photoconductor (charged area development CAD) depending on the charge of the pigmented particles and the charge accumulated on the surface of the imaging plate. In the following, the term "charged particles" is used for charged pigmented particles. The term "pigmented particles" is used for pigmented particles regardless of charge. For example, the charged particles may adhere to discharged areas while being repelled from the charged areas on the photoconductor.

The image on the imaging plate formed by the charged pigmented particles adhering to the imaging plate may then be transferred to a charged and heated intermediate transfer member (ITM), from which the charged pigmented particles are then transferred onto the print medium. In an example, an ITM voltage may be applied to the ITM in order to provide a potential difference between the ITM and the imaging plate, thereby exerting an electrostatic force on the charged particles towards the ITM. In an example, the pigmented particles may be discharged on the surface of the ITM, e.g. by means of an additional discharging device, so that they are substantially free of charge when transferred onto the print medium P. In an example, some residue of the printing fluid may drift together with the charged pigmented particles. In each transfer stage, the amount of this residue may decrease, and the pigmented particles become an adhesive film prior the transfer to the print medium P.

The printing system 100 of this example comprises a developer unit 110, an imaging plate 120 and a control unit 130. The developer unit 110 may be a device to transfer a printing fluid onto the imaging plate 120. The control unit 130 may cause the developer unit 110 to transfer the printing fluid onto the imaging plate 120 by at least one of a first amount per unit area or a second amount per unit area. The second amount per unit area is greater than the first amount per unit area. The first amount per unit area, by which the developer unit 110 transfers the printing fluid onto the imaging plate 120, may correspond to a default amount per unit area as explained above.

In an example, a ratio of the second amount per unit area to the first amount per unit area is between 1.05 and 2.00. In another example, the ratio of the second amount per unit area to the first amount per unit area is between 1.10 and 1.75, or between 1.15 and 1.50.

In a further example, the first amount per unit area corresponds to a first optical density to be applied on the target element, and the second amount per unit area corresponds to a second optical density to be applied on the target element. In an example, a ratio of the second optical density to the first optical density is between 1.05 and 2.00. In another example, the ratio of the second optical density to the first optical density is between 1.10 and 1.75, or between 1.15 and 1.50.

The optical density of an area covered by the printing fluid may be proportional, such as directly proportional to the thickness of the printing fluid applied to the imaging plate 120. Therefore, the optical density increases as the amount of the printing fluid transferred to the imaging plate 120 increases. As discussed above with reference to FIG. 5, the color gamut volume of the printing device 100 can be increased by increasing the optical density to be applied by the developer unit 110. As a result, a larger set of colors can be accurately represented by the printing system 100 by increasing the amount per unit area by which the printing fluid is transferred to the imaging plate.

For example, the printing fluid is a suspension of pigmented particles in a carrier liquid. In an example, the pigmented particles are polymeric colloids that are charged and carrying a color. The carrier liquid may be a liquid having a dielectric constant smaller than the dielectric constant of water. For example, the relative dielectric constant of the carrier liquid may be between 0.5 and 10, or between 1 and 9, or between 2 and 8. In an example, the carrier liquid may be a purified mixture of saturated hydrocarbon, e.g. Marcol 82, or any other type of mineral oil or vegetable oil.

The charged particles may be pigmented according to a specific color determined by at least one of reflection and absorption in the visible spectral range. The printing fluid may be a fluid in which polymers, particles, colorant, charge directors and other additives can be dispersed to form a liquid electrostatic ink or electro-photographic ink. In an example, the developer unit 110 includes a container storing the printing fluid. In another example, the developer unit 110 is connected to a container storing the printing fluid.

The developer unit 110 may comprise a supply path 112 for the printing fluid and a developer roller 114. The supply path 112 may conduct the printing fluid towards the imaging plate 120. The printing fluid or the charged particles are transferred onto the surface of the developer roller 114, which is pressed against the imaging plate 120. The printing fluid or the charged particles are transferred from the developer roller 114 onto the imaging plate 120 and spread over the surface of the imaging plate 120, when the developer roller 114 and the imaging plate 120 are moved relatively to each other, as indicated by arrows in FIG. 1. The developer unit may be referred to as a binary ink developer, BID, unit.

In the example shown in FIG. 1, the imaging plate 120 is depicted as a plate that glides relative to the developer unit 110. In other examples, the imaging plate may be a belt or a roller moving relatively to the developer unit 110.

The control unit 130 can be a dedicated control unit of the printing system 100 or can be external thereto. The control unit may be implemented in at least one of an analog or digital circuit, a logic circuit, a programmable processor, an application specific integrated circuit (ASIC), a programmable logic device (PLD) and/or a field programmable logic device (FPLD) or a combination or part thereof. The control unit may comprise software and/or firmware, including a tangible computer readable storage device or storage disk such as a memory, a digital versatile disk (DVD), a compact disk (CD), a Blu-ray disk, etc. storing the software and/or firmware. The control unit 130 may comprise at least one of a processor 132, a memory 134 and a user interface 136. The processor 132 may select by which amount per unit area the developer unit 110 is to transfer the printing fluid onto the imaging plate 120. The memory 134 may store configurative data for the developer unit 110 according to the respective amount per unit area the printing fluid.

The user interface 136 may enable a communication between the printing system 100 and a user. For example, the user interface 136 may inform the user and receive input from the user relating to the amount per unit area by which the developer unit 110 is to transfer the printing fluid onto the imaging plate 120.

For example, the printing device 100 may by default operate using the first, or default, amount per unit area of the printing fluid transferred. If the digital image to be printed contains an area which color cannot be represented accurately using the first amount of the printing fluid per unit area (i.e. the color is outside of the color gamut volume of the printing system 100 in the first, default, gamut scheme), the printing system 100 may prompt the user to decide either to continue printing using the first amount per unit area or to apply a second gamut scheme, in which the printing fluid is transferred onto the imaging plate 120 by the second amount per unit area. Using the second amount per unit area, the color may be more accurately represented. Furthermore, the user may decide to save the printing fluid by using the first amount per unit area of transferred printing fluid, or to obtain a more accurate color output by using the second amount per unit area.

In an example, the printing system 100 further comprises an image receiving unit 140 to receive an image to be printed, to determine a color property of the image and to transmit a signal including information on the color property to the control unit 130. The image receiving unit 140 may be or include an interface to another device or may be or include a user interface. It further may include a processor for analyzing the received image, determining the color property of the image and generating the signal to be transmitted. The color property may, for example, refer to an assignment of every pixel of the image to the respective coordinates in a color space, e.g. in the L*a*b*-space. Moreover, the color property may relate to the information as to whether or not all the pixels of the image to be printed can be accurately represented by the printing system 100 in terms of the color output by transferring the printing fluid by the first amount per unit area. In this example, the control unit 130 may, during operation, receive the signal from the image receiving unit 140 and cause the developer unit 110 to transfer the printing fluid onto the imaging plate 120 by the first or second amount per unit area. The image receiving unit 140 may be communicatively connected to or integrated into the control unit 130.

As discussed above, the color output in an area covered with the printing fluid may change when the optical density in this area changes. In an example, the printing system 100 may further comprise a compensation unit 150 to determine a deviation of a resulting color gamut corresponding to transferring the printing fluid by the second amount per unit area from a color gamut corresponding to transferring the printing fluid by the first amount per unit area. The compensation unit 150 may then correct the color output by compensating the determined deviation. The compensation unit 150 may include a processor for determining the deviation. The image receiving unit 140 and the compensation unit 150 may be communicatively connected to or integrated with the control unit 130.

Figure 2:
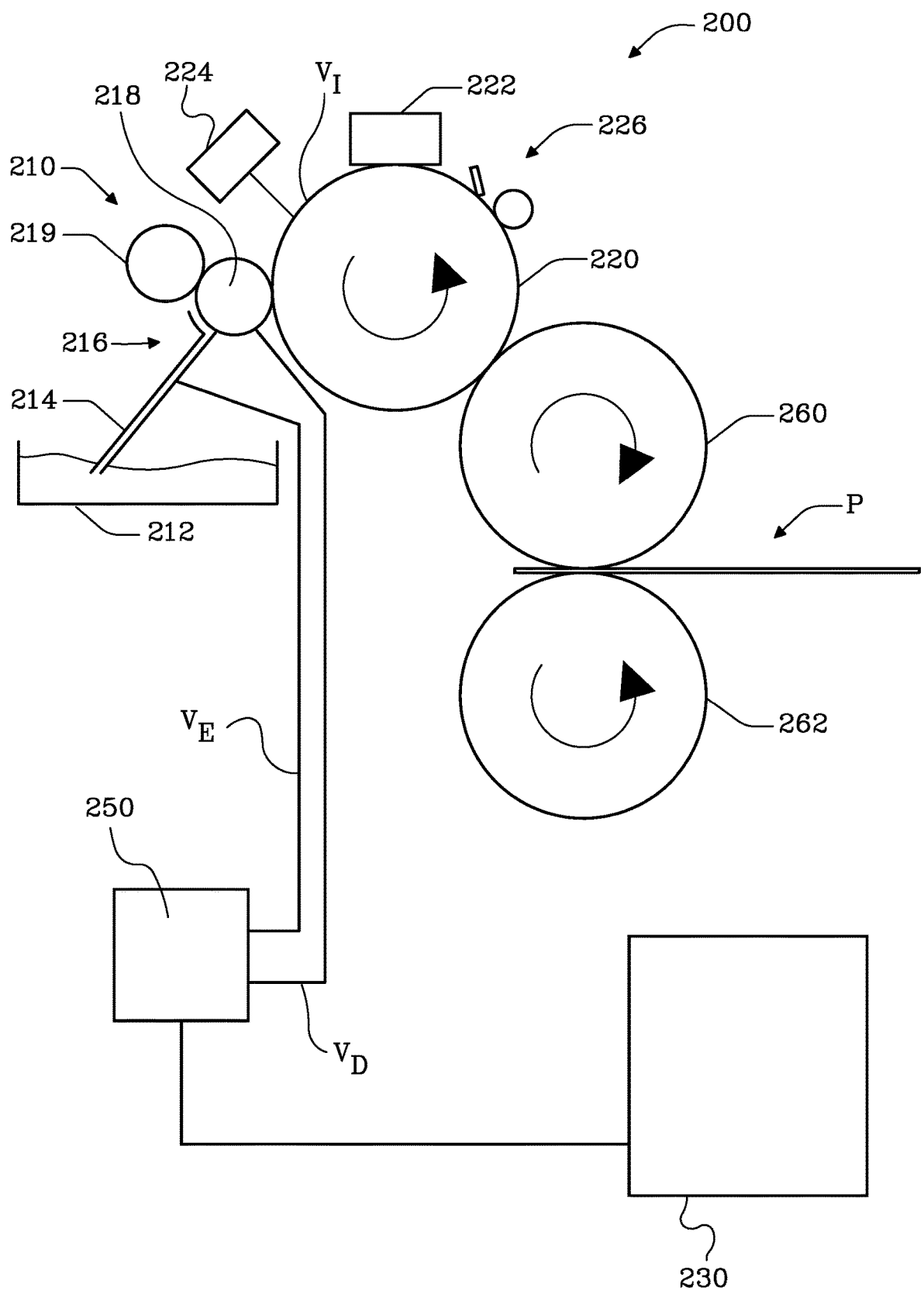
FIG. 2 is a schematic cross-sectional view of a printing system, according to an example.

FIG. 2 is a schematic cross-sectional view of a printing system 200 according to an example. In some examples, the printing system 200 comprises all or at least part of the features described above with respect to the printing system 100. Reference is made to the description of the entities provided above and shown in FIG. 1.

The printing system 200 comprises a developer unit 210, an imaging plate 220 and a control unit 230. The developer unit 210 either includes or is connected to a container storing a printing fluid. The developer unit 210 may transfer the printing fluid onto the imaging plate 220. The control unit 230 may selectively cause the developer unit 210 to transfer the printing fluid onto the imaging plate 220 by a first amount per unit area or by a second amount per unit area, wherein the second amount per unit area is greater than the first amount per unit area. The printing system 200 may be an LEP printing system. In the following, the example of FIG. 2 is described according to as an LEP printing system.

The printing system 200 further comprises a developer voltage source 250. The developer voltage source 250 may apply a developer voltage V_D to the developer unit 210 to exert an electrostatic force on the charged particles of the printing fluid towards the imaging plate 210. Moreover, an imaging plate voltage V_I may be applied to the imaging plate 220 through a charging station 222 and a discharging station 224 which are described in detail below.

The developer unit 210 includes a container 212, a supply path 214, an electrode arrangement 216 and a developer roller 218. Optionally, the developer unit 210 includes a squeegee roller 219. The container 212 stores the printing fluid including charged particles suspended in a carrier liquid. Examples of the charged particles and the carrier liquid may correspond to the above description with respect to the printing system 100 of FIG. 1.

The electrode arrangement 216 of the developer unit 210 may comprise a main electrode and a back electrode, forming the supply path 214 in between. During operation, the developer roller 218 may receive the charged particles from the container 212 via the supply path 214. The printing fluid may comprise a charge director attached to the pigmented particles, thereby making the particles susceptible to electrostatic fields.

An electrostatic potential may be applied between the electrode arrangement 216 and the developer roller 218 such that the charged pigmented particles adhere to the developer roller 218. Furthermore, the density of the charged particles on the surface of the developer roller 218 may depend on the strength of the electric field generated between the developer roller 218 and the electrode arrangement 216.

The width in an axial direction of the developer roller 218 may span a nominal printing width of the system 200 and correspond or substantially correspond to the width of the imaging plate 220 (in the direction of its rotational axis).

The squeegee roller 219 may exert mechanical forces onto the charged particles towards the surface of the developer roller 218 when urging the charged particles through the nip between the squeegee roller 219 and the developer roller 218. Additionally, the squeegee roller 219 may be charged to a different voltage than the developer roller 218 to exert electrostatic forces onto the charged particles towards the developer roller 218, thereby densifying the layer of charged particles on the surface of the developer roller 218.

The imaging plate 220 may comprise a thin film of photoconductive material wrapped around the cylindrical surface of a rotating drum. In another example, a photoconductive film may be provided on a belt or plate which is movable relative to the developer unit 210.

During operation, a uniform electrostatic charge may be applied to an area on the surface of the imaging plate 220, for example on the surface of its photoconductive material, when passing by the charging station 222. The charging station 222 may heretofore comprise a charging device, for example, a scorotron or a charge roller. The resulting charge may correspond to the imaging plate voltage V_I.

Selectively charged surface areas on the surface of the imaging plate 220 may be formed when the uniformly charged area of the imaging plate 220 passes by the selective discharging station 224. For example, the selective discharging station 224 may selectively expose the surface of the photoconductive material to light. As a result, the charge on the exposed areas may dissipate. For instance, the surface of the photoconductive material may be selectively discharged by a laser or another photo imaging device. Hence, the surface of the imaging plate 220, or its photoconductive material, passing by the selective discharging station 224 may be provided with charged and discharged areas, forming a latent image. A voltage differential between the charged and the discharged areas may, for example, be more than 200 V, more than 400 V, or more than 600 V, or in the range of 200 V to 1000 V. The charged and discharged areas may correspond to a pixel pattern of an image to be printed.

The latent image on the imaging plate 220, carried on the surface areas having passed the selective discharging station 224, may then be developed by transferring the charged particles onto the imaging plate 220 according to different adhesion schemes. In the case of DAD, the charged particles may adhere to the discharged areas of the imaging plate 220, while being repelled from the charged areas of the imaging plate 220. In the case of CAD, the charged particles may adhere to the charged areas of imaging plate 220 while being repelled from the discharged areas of the imaging plate 220. In either case, a pattern of charged particles in a layer of uniform particle concentration may be selectively formed on designated areas on a surface of the imaging plate 220. For example, the imaging plate 220 voltage next to the developer roller 218, $V\_I$, can be either at a high voltage state due the charge transfer from the charge roller 222, or at a low voltage state where the laser 224 has inscribed on the imaging plate 220 a latent image. Ink is transferred from the BID unit to the imaging plate 220, where the voltage $V\_I$ is at the low state, i.e. where there is the latent image.

The transferred amount of the printing fluid, for example the charged particles thereof, per unit area may depend on a difference between the developer voltage $V\_D$ applied to the developer unit 210 and the imaging plate voltage $V\_I$ applied to the imaging plate 220.

In FIG. 2, the developer voltage $V\_D$ is illustrated to be applied to the developer unit 210 in a schematic manner. For example, the developer voltage $V\_D$ may be applied to the developer roller 218. For example, the transferred amount per unit area may depend on a voltage difference between a voltage applied to the developer roller 218 and the electrical charge on the surface of the imaging plate 220. Additionally or alternatively, the transferred amount per unit area may depend on a voltage difference between an electrode voltage $V\_E$ applied to the electrode arrangement 216 and the electrical charge on the surface of the imaging plate 220.

In an example, the electrode voltage $V\_E$ may be applied to charge the pigmented particles of the printing fluid relative to the developer voltage $V\_D$. The electrode voltage $V\_E$ may be set such that the resulting voltage on the surface of the charged pigmented particles may be different to $V\_D$. The electrode voltage $V\_E$ may be adjusted such that the desired optical density is achieved on the target element. Accordingly, the transferred amount per unit area of the printing fluid may depend on a voltage difference between the electrode voltage $V\_E$ and the developer voltage $V\_D$. For example, at least one of the voltages $V\_E$ and $V\_D$ may be determined relative to the imaging plate voltage $V\_I$. The control unit 230 may control at least one of the voltages $V\_D$, $V\_I$ and $V\_E$.

Alternatively or additionally, the electrical conductivity of the charged particles in the printing fluid may be varied in order to change the transferred amount per unit area. Alternatively or additionally, the concentration or density of the pigmented particles in the transferred printing fluid per unit area may be varied in order to change the transferred amount per unit area. Adjusting the electric field between the electrode and the developer and/or between the developer and the imaging plate, this can be performed for a specific printing fluid, under consideration of its conductivity and concentration or density.

Accordingly, the amount of the transferred printing fluid per unit area may be controllable by controlling the voltage difference between the developer unit 210 and the imaging plate 220. The first amount per unit area and the second amount per unit area as defined above may then correspond to a first voltage difference and a second voltage difference, respectively, between the developer unit and the imaging plate. The first voltage difference may be greater or less than the second voltage difference, depending on the adhesion scheme of the charged particles from the developer unit 210 onto the imaging plate 220.

The residual charge may then be removed from the imaging plate 220, for example by exposing the imaging plate 220 to light of an LED lamp or an additional discharging device (not shown in FIG. 2). The additional discharging device may dissipate the electrostatic charge on the surface of the imaging plate 220 and the pigmented particles adhering onto it before being transferred to a next target element, for example an intermediate transfer member (ITM).

In an example, the layer of patterned pigmented particles may then be transferred onto the ITM 260. The ITM 260 may, for example, comprise a chargeable blanket wrapped around a rotating drum. The blanket may be heated to fuse pigmented particles adhering to the ITM 260. The resulting layer of fused pigmented particles may be transferred from the ITM 260 to a print medium P.

The print medium P, which may be paper, foil, textile, or any other medium, may be delivered to the printing system 200, for example, as a continuous web, as dispensed from a roll, or as individual sheets, etc., and pass through a nip between the ITM 260 and a pressure roller 262. The pressure roller 262, which may also be referred to as an impression cylinder (IMP), may press the print medium P in the nip against the surface of the ITM 260 such that the layer may be cooled down and adhere to the print medium P.

After transferring the layer onto the ITM 260, residue of the pigmented particles may be removed from surface areas of the imaging plate 220, e.g. by a cleaning station 226. After being cleaned, a uniform electrostatic charge may be re-applied to the imaging plate 220 by the charging station 222 to start a new cycle. In each cycle, a process color may be printed by transferring pigmented particles of the respective color onto the imaging plate 220. If an image requires printing more than a single process color, multiple color layers may be transferred one after the other, from multiple developer units 210 via the imaging plate 220 to the ITM 260. The ITM 260 may either overlay the color layers and transfer the final image onto the print medium P, or transfer the color layers one after the other onto the print medium P.

Figure 3:
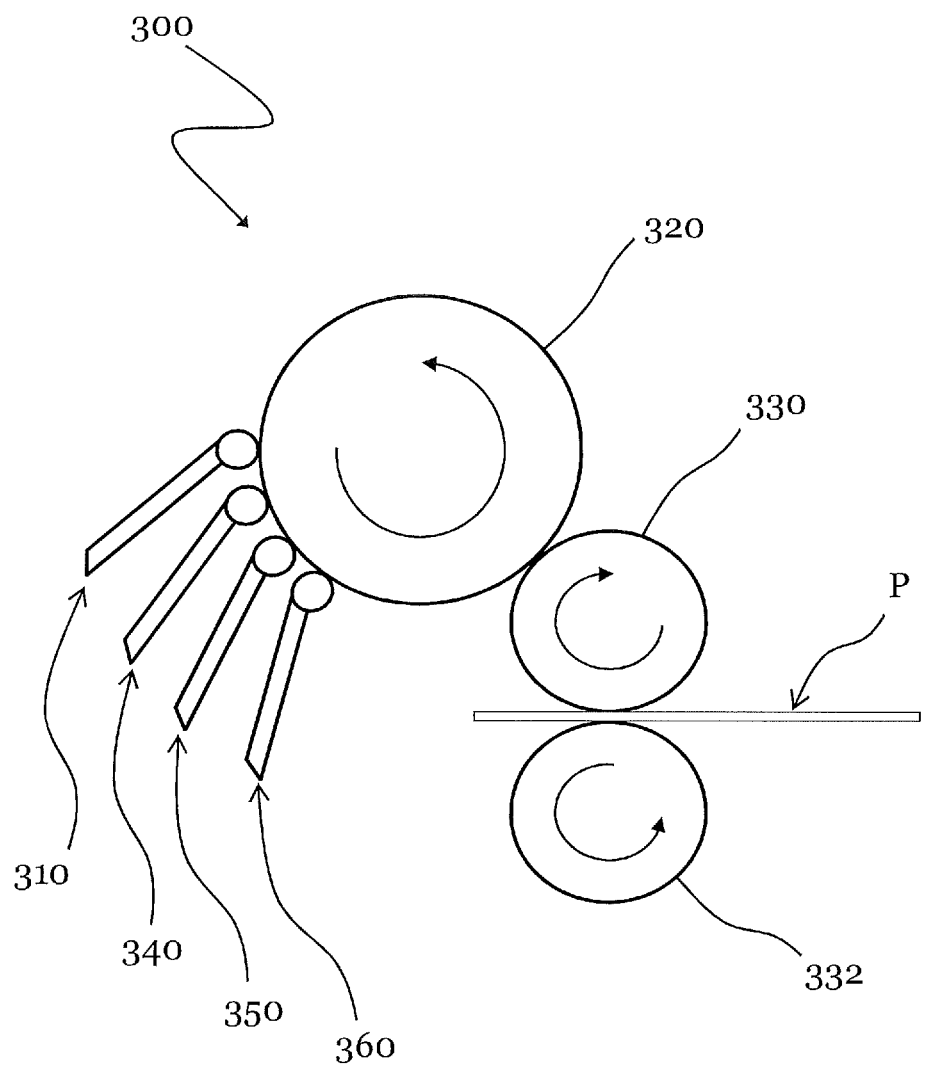
FIG. 3 is a schematic cross-sectional view of a printing system, according to an example.

FIG. 3 is a schematic cross-sectional view of a printing system 300 according to an example. In some examples, the printing system 300 comprises all or at least part of the features described above with respect to the printing system 100 or the printing system 200. Reference is made to the description of the entities provided above and shown in FIGS. 1 and 2.

The printing system 300 comprises a first developer unit 310, an imaging plate 320, an ITM 330 and a pressure roller 332 with the respective functions and operation as described above. The printing system 300 further comprises a further, second developer unit 340 which may transfer a further, second printing fluid onto the imaging plate 320 by a third or fourth amount per unit area. The second printing fluid may be include charged particles suspended in a carrier liquid, as described above with respect to the printing fluid, which is in the following referred to as a first printing fluid, wherein the color of the charged particles of the second printing fluid differs from the color of the charged particles of the first printing fluid. The charged particles of the first and second printing fluids may refer to different process colors of a color model, for example CMYK.

The fourth amount of the transferred printing fluid per unit area is greater than the third amount per unit area. According to the description above with respect to the developer unit 110 or developer unit 210, a control unit (not shown in FIG. 3) may selectively cause the second developer unit to transfer the second printing fluid by either the third amount per unit area or the fourth amount per unit area. This decision may depend on the color property of the image to be printed, as described above.

The third amount per unit area may correspond to a third optical density of the second printing fluid on the target element, and the fourth amount per unit area may correspond to a fourth optical density of the second printing fluid on the target element similar to the above description with respect to the first and second amounts per unit area.

In an example, the printing system 300 may further comprise a third developer unit 350 which may transfer a third printing fluid to the imaging plate 320 by either a fifth amount per unit area or a sixth amount per unit area, wherein the sixth amount per unit area is greater than the fifth amount per unit area. The third printing fluid may include charged particles suspended in a carrier liquid, similar to the above description with respect to either of the developer units 110, 210, 310 and 340, and differs from the first and second developer units 310, 340 in the color of the charged particles. The first printing fluid, the second printing fluid and the third printing fluid may be associated with three different process colors of a color model, for example CMYK. Similar to the developer units 110, 210, 310 and 340 as described above, a control unit may selectively cause the third developer unit 350 to transfer the third printing fluid to the imaging plate 320 by the fifth amount per unit area or by the sixth amount per unit area. The decision as to using the fifth amount per unit area or the sixth amount per unit area may be made depending on color property of the image to be printed, as described above.

The first, second and third developer units may be referred to as a first, second and third BID units, respectively. The first amount per unit area may be different from at least one of the third amount per unit area and the fifth amount per unit area. In an example, the second amount per unit area may be different from at least one of the fourth amount per unit area and the sixth amount per unit area.

In an example, the printing system 300 may comprise at least another developer unit 360, depending on the color model and operation type of the printing system 300. For example, the printing system 300 may comprise in total seven developer units, wherein at least one of, or either one of, the developer units may transfer a respective printing fluid by a respective first (e.g. default) amount per unit area or by a respective second (e.g. increased) amount per unit area, wherein the respective second amount per unit area is greater than the respective first amount per unit area. The first amounts per unit area of the different developer units may be different from one another. The second amounts per unit area of the different developer units may be different from one another. A control unit may selectively cause at least one of the developer units to transfer the respective printing fluid onto the imaging plate 320 either by the respective first amount per unit area or by the respective second amount per unit area. Whereas, in the above description, the second and third developer units have been described in relation to third, fourth, etc. printing fluid amounts per unit area, for sake of clarity, reference is made only to a first printing fluid amount per unit area (which may correspond to a default amount) and a second printing fluid amount per unit area (which may correspond to an increased amount) in the following description of the operation of each of the developer units. Nevertheless, the first printing fluid amount per unit area and the second print fluid amount per unit area may be different for each of the developer units.

The change of the color gamut volume may depend on the process color, for which the optical density is varied by means of the transferred amount per unit area. In an example, the transferred amount per unit area of the printing fluid of either of the developer units 310, 340, 350, 360 may be chosen independently from one another, thereby increasing the color gamut volume at different locations in the color space. For example, if the optical density of two colors of the CMY colors is increased by a set amount, a certain Gamut increase is achieved. If a different combination of two colors is selected for increasing the optical density of each color by the same set amount, a different Gamut increase is obtained. The decision as to which of the developer units 310, 340, 350, 360 should transfer which amount per unit area of the printing fluid may depend on the image to be printed, while the user may confirm using the respective increased amount per unit area or instead apply the default amount per unit area. Hence, the printing system 300 allows for a selective increase of the color gamut volume in a selective portion of the color space by increasing the transferred amount per unit area for the corresponding developer unit(s). Therefore, for example, a total used amount of the printing fluids may be reduced.

Figure 4:
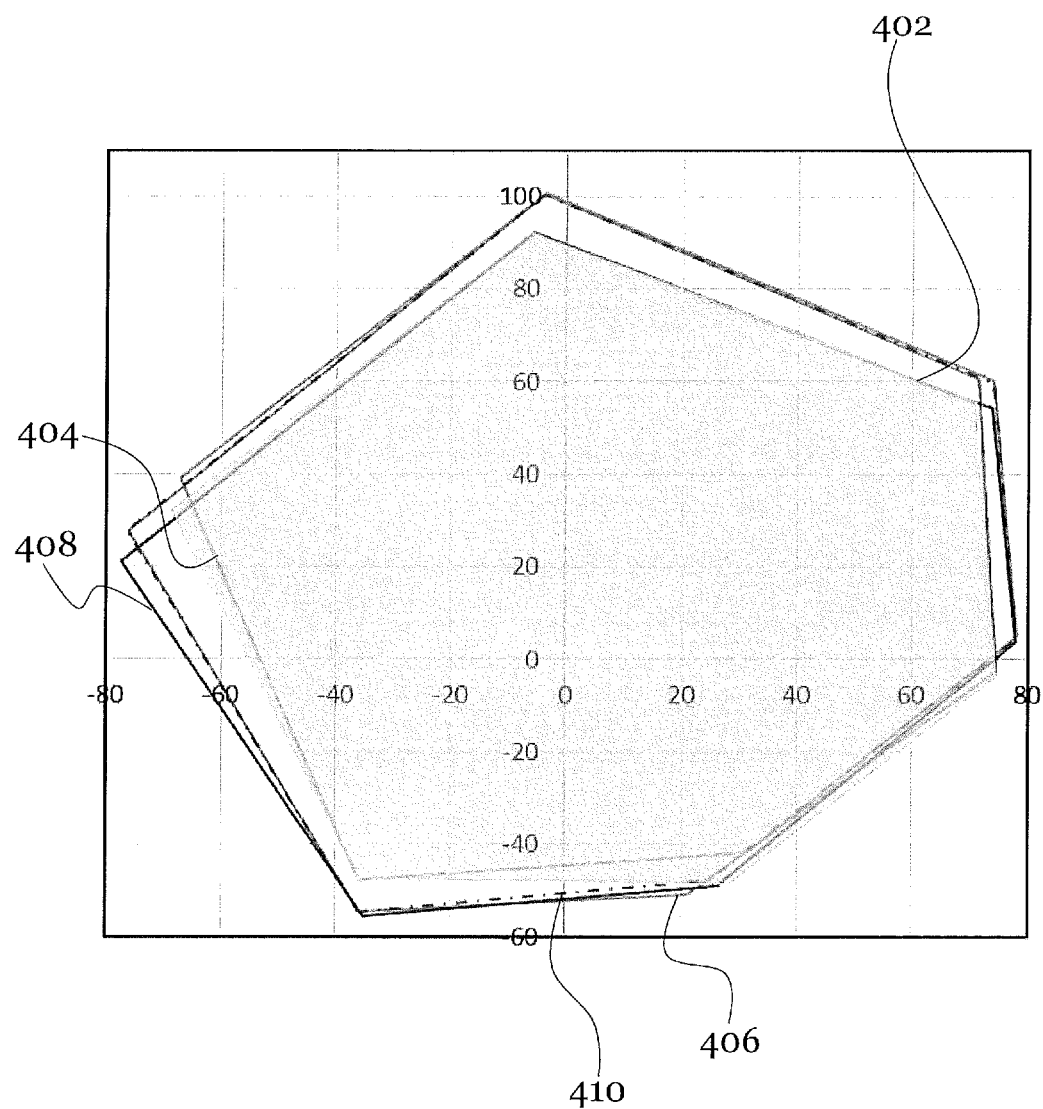
FIG. 4 is an illustration of color gamut coverage in a*-b*-plane when the respective optical density for the process colors CMY is altered, according to an example.

FIG. 4 illustrates the coverage of a*-b*-plane when the respective optical density for each of the process colors CMY is altered. A shaded area enclosed by a first loop 402 refers to a gamut scheme with all of the process colors transferred by a respective first amount per unit area corresponding to a default optical density. In the example shown in FIG. 4, the respective default optical density of cyan, magenta and yellow are 1.26, 1.30 and 0.98.

A second loop 404 refers to a gamut scheme when the optical density for either of magenta and yellow is increased to 1.59 and 1.13, respectively, while the optical density of cyan remains at 1.26.

A third loop 406 refers to a gamut scheme when the optical density for either of cyan and yellow is increased to 1.77 and 1.13, respectively, while the optical density of magenta remains at 1.30.

A fourth loop 408 refers to a gamut scheme when the optical density for either of cyan and magenta is increased to 1.77 and 1.59, respectively, while the optical density of yellow remains at 1.13.

A fifth loop 410 refers to a gamut scheme when the optical density for all the process colors, cyan, magenta and yellow is increased to 1.77, 1.59 and 1.13, respectively.

Test results show that the color gamut volume coverage increases from 58%, corresponding to using the default optical density for all of the process colors, to 63% to 65% when two of the process colors are transferred by the respective second, increased, amount per unit area. It was found that the color gamut volume coverage increases to approx. 66% when all three of the process colors are applied by the respective second, increased, amount per unit area, corresponding to the respective increased optical density.

Accordingly, the color gamut volume coverage and thus the set of color that can be accurately represented by a printing system can be increased by transferring the printing fluid of either of the developer units by an increased amount per unit area higher than the default amount per unit area. The optical density applied to the target element, such as the imaging plate or the print medium, increases as the transferred amount of the respective printing fluid per unit area increases.

In a further example, the developer unit as described above may transfer the printing fluid by more than two different amounts per unit area, either of which can be selected by the control unit corresponding to the color property of the image to be printed.

An example of a method for operating a printing system comprises transferring, by a developer unit, a printing fluid onto an imaging plate selectively by a first amount per unit area or by a second amount per unit area. The second amount per unit area is greater than the first amount per unit area.

Figure 6:
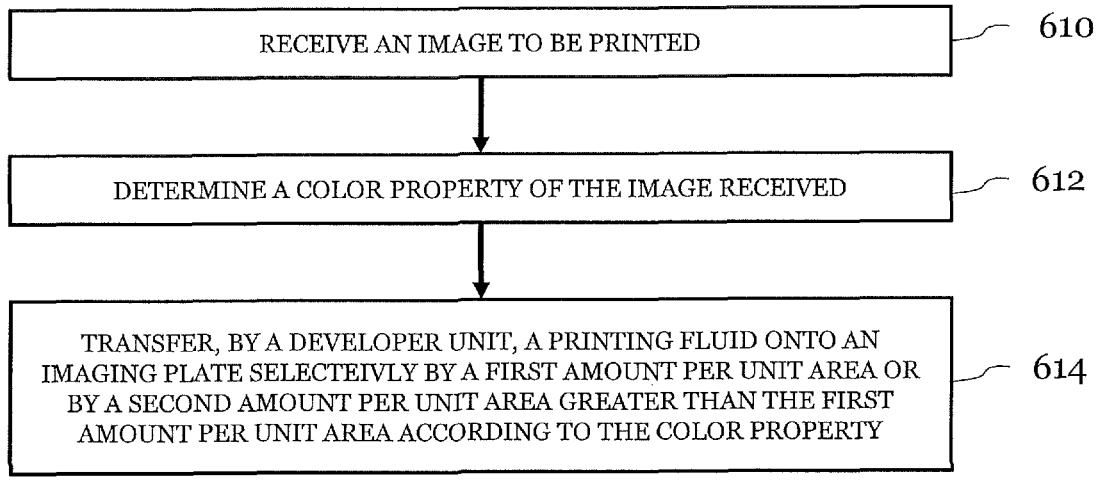
FIG. 6 is a flowchart of a process for operating a printing system according to an example.

FIG. 6 is a flowchart according to an example of a method for operating a printing system, for example any of the printing systems 100, 200 and 300 as described above. In the example shown in FIG. 6, an image to be printed may be received 610, and a color property of the image to be printed may be determined 612. A developer unit may transfer 614 a printing fluid onto an imaging plate selectively by a first amount per unit area or by a second amount per unit area, according to the color property of the image.

Figure 7:
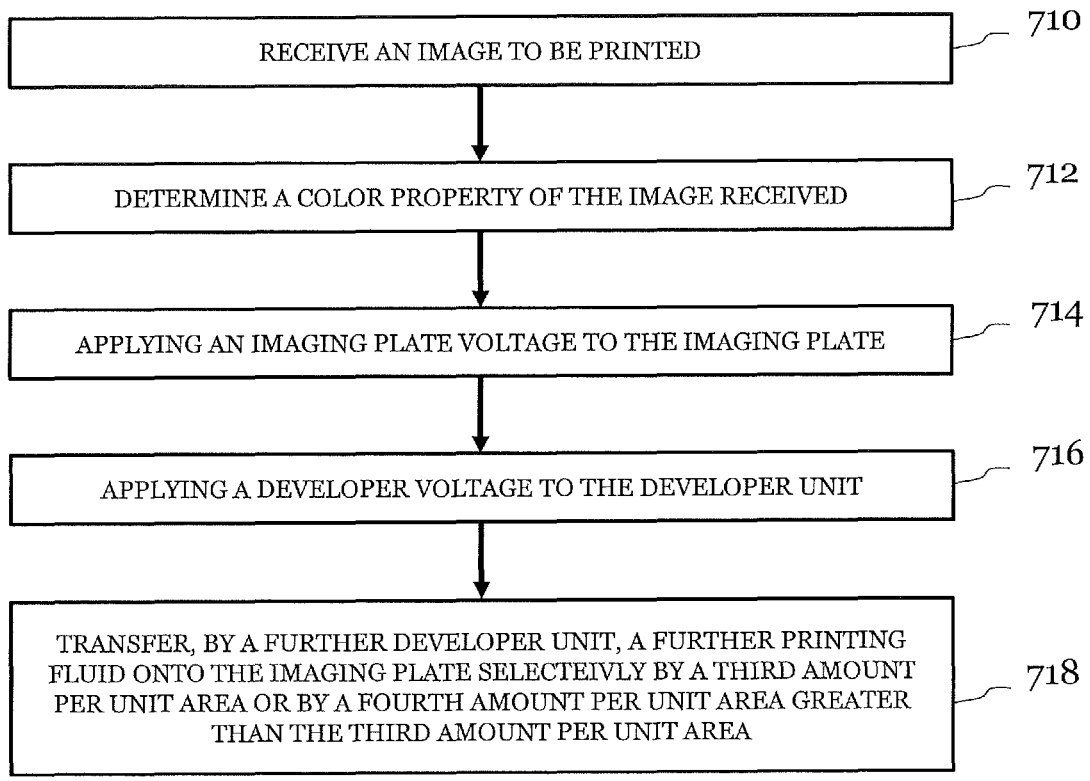
FIG. 7 is a flowchart of another process for operating a printing system according to an example.

FIG. 7 is a flowchart according to an example of a method for operating a printing system, for example any of the printing systems 100, 200 and 300 as described above. In the example shown in FIG. 7, a developer unit may transfer a printing fluid, which contains charged particles suspended in a carrier liquid, onto an imaging plate selectively by a first amount per unit area or by a second amount per unit area, wherein the second amount per unit area is greater than the first amount per unit area. According to the example shown in FIG. 7, an image to be printed is received 710, and a color property of the image to be printed is determined 712. An imaging plate voltage may be applied 714 to an imaging plate, and a developer voltage may be applied 716 to the developer unit to exert an electrostatic force on the charged particles towards the imaging plate. The first amount per unit area and the second amount per unit area may correspond to a first difference and a second difference, respectively, between the imaging plate voltage and the developer voltage. The method may further comprise a further developer unit transferring 718 a further printing fluid onto the imaging plate, selectively by a third amount per unit area or by a fourth amount per unit area, wherein the fourth amount per unit area is greater than the third amount per unit area.

In the examples shown in FIGS. 6 and 7, different amounts per unit area of the respective printing fluid transferred may be associated with a respective optical density, thereby modifying the color gamut volume of the printing system, as described above.

The invention claimed is:

1. A liquid electro-photographic printing system, comprising:
   a developer unit to transfer a printing fluid onto an imaging plate; and
   an image receiving unit and/or a control unit to:
   receive an image to be printed;
   determine that a color in the image is outside a color gamut volume of the printing system corresponding to a first, default gamut scheme in which the printing fluid is transferred from the developer unit to the imaging plate in a first amount per unit area; and then
   cause the printing system to print the image using a second gamut scheme in which the printing fluid is transferred from the developer unit to the imaging plate in a second amount per unit area greater than the first amount per unit area.

2. The system of claim 1, wherein the image receiving unit and/or the control unit to, after determining that a color in the image is outside a color gamut volume of the printing system and before printing the image, prompt a user to decide between printing using the first gamut scheme or printing using the second gamut scheme.

3. A method for operating a liquid electro-photographic printing system in which a printing fluid is transferred from a developer unit to a photo imaging plate, the method comprising:
   receiving an image to be printed;
   determining a color in the image is outside a color gamut volume of the printing system corresponding to a first, default gamut scheme in which the printing fluid is transferred from the developer unit to the imaging plate in a first amount per unit area; and then
   printing the image using a second gamut scheme in which the printing fluid is transferred from the developer unit to the imaging plate in a second amount per unit area greater than the first amount per unit area.

4. The method of claim 3, further comprising, after the determining and before the printing, prompting a user to decide between printing using the first gamut scheme or printing using the second gamut scheme.

* * * * *